July 2, 1968 M. WIESLER ET AL 3,390,973

SEALING HEAD FOR GLASS DIODES

Filed Oct. 11, 1963 2 Sheets-Sheet 1

INVENTORS
MORDECHAI WIESLER
AVIGDOR GOREN
BY Moro & Altman
ATTORNEYS

July 2, 1968 M. WIESLER ETAL 3,390,973

SEALING HEAD FOR GLASS DIODES

Filed Oct. 11, 1963 2 Sheets-Sheet 2

INVENTORS
MORDECHAI WIESLER
AVIGDOR GOREN
BY Morse + Altman
ATTORNEYS

United States Patent Office 3,390,973

Patented July 2, 1968

3,390,973

SEALING HEAD FOR GLASS DIODES

Mordechai Wiesler, Brookline, and Avigdor Goren, Cambridge, Mass., assignors to Transistor Automation Corp., Cambridge, Mass., a corporation of Massachusetts Filed Oct. 11, 1963, Ser. No. 315,655
1 Claim. (Cl. 65—154)

This invention relates generally to devices for assembling solid state glass enclosed diodes and more particularly is directed towards a new and improved assembling head for joining and sealing diode components.

Solid state, semi-conductor diodes generally comprise a pair of leads extending from either end of a hollow glass bead usually of miniature size and encasing a solid state element attached to the end of one lead and a whisker element attached to the end of another lead. The two leads usually are joined to the bead by applying sufficient heat to the glass so as to fuse the ends onto the prepositioned leads.

Several problems are involved in fusing the leads to the glass bead since the various components usually are quite small and light and awkward to handle with precision. The most difficult problem encountered in assembling diodes relates to the precise alignment of the leads, the whisker element and the crystal diode. These various components must be precisely aligned and connected under the exacting standards in order for the diode to function in a proper manner. The mechanisms employed heretofore in the manufacture of solid state diodes have not been entirely satisfactory because of a high number of rejects resulting from misaligned or misconnected components.

Accordingly, it is an object of the present invention to provide improvements in mechanisms for assembling solid state glass enclosed diodes and the like.

Another object of this invention is to provide a new and improved sealing head for fusing diode components in precise relationship to one another.

A further object of this invention is to provide a diode sealing head for use in the automatic manufacture of glass enclosed diodes which head is of relatively simple, low-cost construction yet functions with extreme accuracy and dependability.

More particularly, this invention features a diode sealing head comprising a nest and plunger assembly adapted to receive in end to end relation one lead having a beading and whisker at one end thereof and another lead having an attached crystal and fusible socket. The plunger is adapted to insert and precisely position the whisker end of the beading within the socket end of the crystal lead and to hold the components in proper relationship while heat is applied to form a glass-to-glass seal. Means are also provided for applying electrical pulses to the component for the purposes of bonding the whisker to the crystal.

Figure 2:
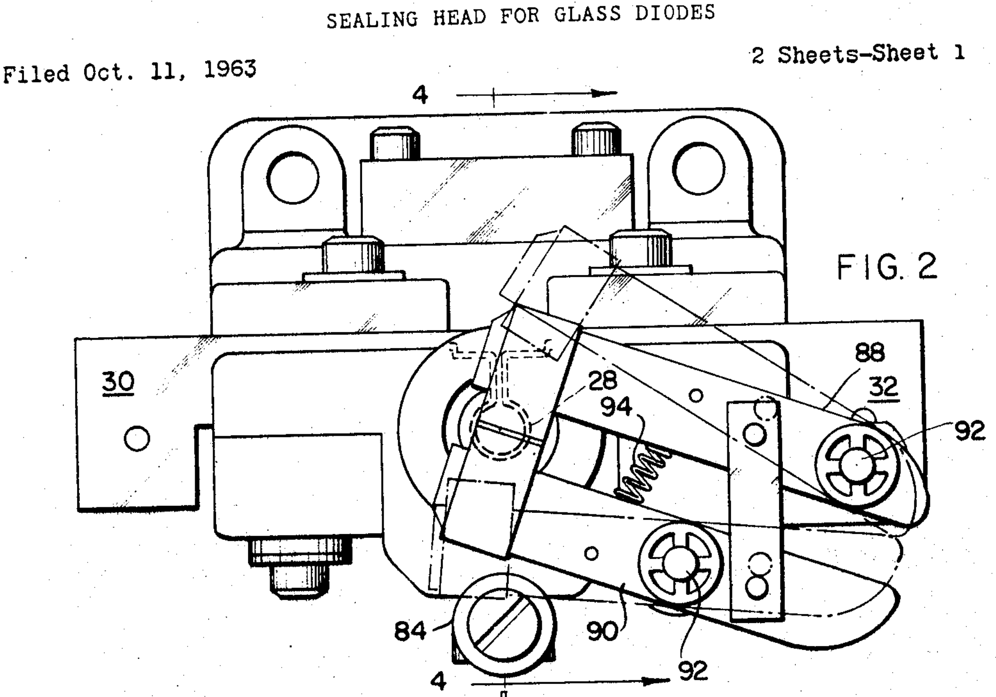
Figure 1:
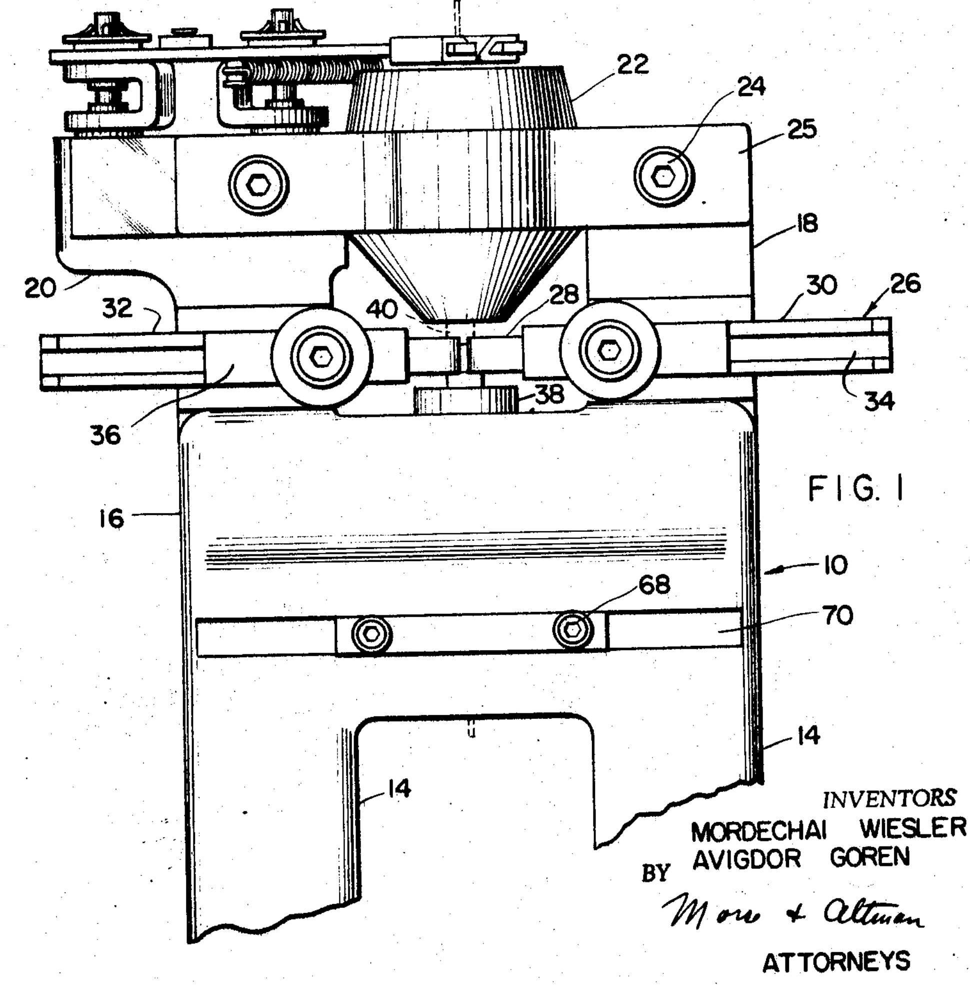
Figures 3, 4:
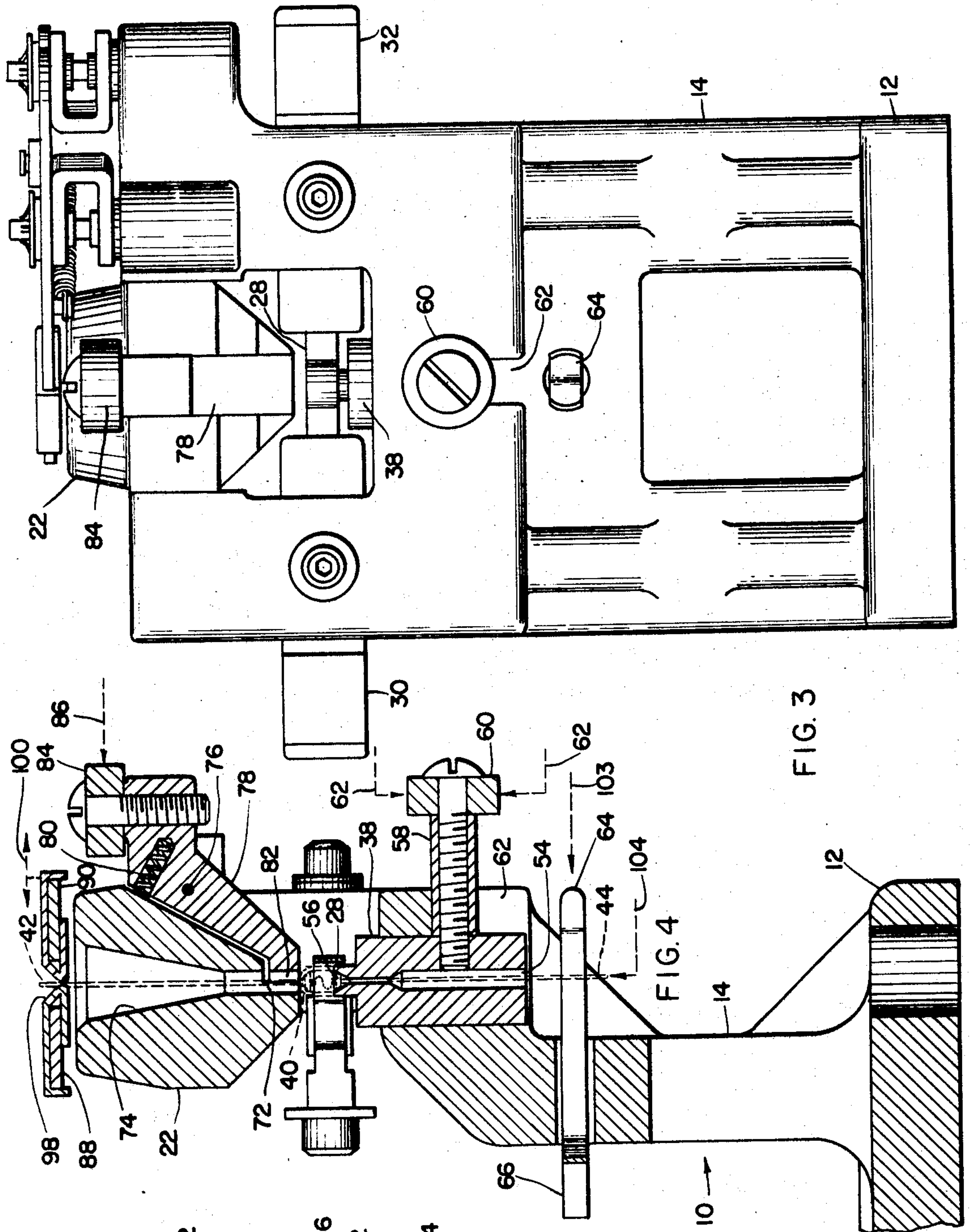
Figure 5:
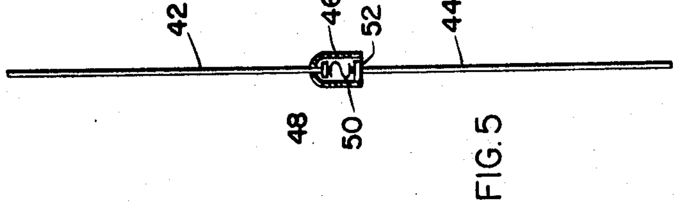

However these and other features of the invention, along with further objects and advantages thereof, will become more fully apparent from the following detailed description of a preferred embodiment of the invention with reference being made to the accompanying drawings in which:

FIG. 1 is a view in front elevation of a sealing head made according to the invention, FIG. 2 is a top plan view thereof, FIG. 3 is a view in rear elevation, FIG. 4 is a sectional view in side elevation, and FIG. 5 is a side elevation, partly in section, of a semiconductor diode of the sort which may be assembled by the invention.

Referring now to the drawings, the reference character 10 generally indicates a frame of cast and machined brass, bronze or the like, and having a flat base 12 integral with a pair of upright legs 14 joined by a body portion 16 from which extend a pair of upright arms 18 and 20 vertically offset from the legs 14. Mounted between the arms 18 and 20 is a nest member 22 comprising a cross piece 25 secured at its ends to the arms 18 and 20 by bolts 24. Also mounted to the arms 18 and 20 is a heating unit 26 comprising a ribbon filament 28 supported at its ends by a pair of plates 30 and 32 each fastened to an arm 18 and 20 respectively and each formed with a horizontal groove 34. Each end of the filament 28 is seated in the end of a groove 34 and held in position by a block 36 bolted to the plates.

It will be noted that the filament 28 is located between the lower end of the nest 22 and the upper end of a plunger 38 located in the body portion 16 of the frame 10. The plunger and nest are formed with coaxial openings and separted by a gap. As shown in outline in FIG. 2 the filament 28 is bent into a loop which extends into the gap between the nest and plunger and substantially surrounds the head of a diode 40. As shown in FIG. 5 a typical diode comprises a pair of leads 42 and 44 connected to either end of a hollow glass bead or jacket 46 encasing a solid state crystal element 48 and a whisker 50. In practice the lead 42 is formed with the crystal 48 attached to the end thereof together with the jacket 46 which initially is cup shaped as shown. The lead 44 has the whisker 50 attached to the end thereof and a beading of glass 52 fused onto the end thereof. The component is assembled by insertion of the whisker 50 and the beading 52 within the cup shaped jacket 46 and fusing the beading 52 to the jacket 46 to form a permanent bond.

The plunger 38, best shown in FIG. 4, is mounted for reciprocation within the body portion 16 of the frame 10 and is formed with a vertical passage 54 which terminates at its upper end in a conical recess 56. Extending right-angularly from the plunger 38 is a rigid support 58 for a roller 60. It will be noted in FIGS. 3 and 4 that the body portion 16 is formed with a vertical recess 62 to accommodate a vertical movement of the support 58 so that a cam or other actuator, indicated by the dotted arrows 62, may reciprocate the plunger 38 within the body portion.

Mounted between the upper ends of the legs 14 and extending horizontally therethrough is a clip 64 which extends directly below the passage 54. The clip is fixed to a block 66 mounted in a groove 70 formed in the front face of the frame 10. Referring again to FIG. 4 it will be seen that the nest 22 is formed from a vertical passage 72 in register with the passage 54 of the plunger and terminates at its upper end in a relatively deep conical recess 74. Pivotally mounted by a pin 76 to the rear face of the nest is a clamp 78 normally biased in a clockwise direction or closed position by means of a coil spring 80 located within the clamp and bearing against the nest. The lower end of the clamp is formed with an arcuate recess 82 and extends normally into the bottom portion of the nest adjacent the passage 72. Mounted to the opposite end of the clamp is a roller 84 adapted to engage a cam or other actuator, indicated by the dotted arrow 86, whereby the clamp may be intermittently pivoted from a closed to an open position.

Mounted to the upper portion of the frame on the arm 20 is a pair of jaws 88 and 90 each pivoted to an upright post 92 and normally urged into a closed position by means of a spring 94 connecting both of the jaws. It will be noted that the posts 92 are offset from one another and that the jaws are joined by a link of dielectric material. The link is so connected to the jaws that a movement of one jaw produces an opposing movement in the other jaw whereby the jaws may be opened and closed in unison. Each of the jaws is provided with a lead engaging contact 98 forming a bevelled edge and adapted to grip against the upper end of the lead 42 for a diode which has been deposited in the device. It will be understood that the jaws are adapted to be opened and closed by means of a suitable actuator indicated in general by the dotted arrow 100.

In the practice of this invention the heating filament 28 will be periodically energized from a suitable power source connected to the blocks 36 and additional electrical connections will be made to the jaw assembly 88 and 90 and to the clip 64 through the block 66. It will be noted that the jaw assembly 88 and 90 is electrically insulated from the frame 10 by means of dielectric grommets mounted between the posts 92 and the frame 10.

In the operation of the invention, the diode components are assembled in the following sequence; a lead 44 having an attached glass beading 52 and whisker 60 is deposited into the nest 22 with the whisker uppermost. The lead drops down through the nest passage 72 into the plunger passage 54 and comes to rest with the beading 54 seated within the conical recess 56. A suitable actuator, indicated generally by a dotted arrow 103, will wedge between the legs of the clip, spreading them apart to permit the lower end of the lead 44 to drop through. Once the lead is between the legs of the clip 64 the actuator is withdrawn and the clip closes against the lead. During the feeding of the lead 44 the jaws 88 and 90 will be in an open position. Subsequently a lead 44 having an attached glass jacket 46 and crystal 48 oriented downward is deposited in the nest 22. The jaws 88 and 90 will still be in their open position and the clamp 78 also will be biased in an open position to permit the relatively large jacket 46 to pass into the gap between the nest and the plunger. Once the jacket has passed into the gap the clamp will pivot into a closed position to prevent the jacket 46 from being displaced upwardly.

With the clamp 78 closed the plunger 38 is reciprocated upwardly to position the whisker 50 and beading 52 within the jacket 46. Once the whisker and beading are inserted in the jacket the plunger is retracted and the parts maintained in their assembled position by reason of the frictional engagement of the clip 64 with the lower end of the lead 44. Thereafter an advance mechanism, not part of this invention but generally indicated by the reference character 104, and disclosed in our U.S. Patent No. 3,292,248 automatically pushes up against the lower end of the lead 44 to advance the whisker 50 until it touches the crystal 48. Electrical pulses are then applied through the jaw assembly 88 and 90 and the clip 64 to bond the whisker to the crystal. At this point the junction may be presented on an oscilliscope for a short duration. A heating cycle is then started in order to energize the ribbon filament 28 and thereby fuse the jacket 46 to the beading 52. After cooling the clamp 72 is pivoted into an open position and an assembled diode is withdrawn.

It will be appreciated that the device is simple, positive acting yet provides extremely exact positioning of the diode components. The parts are necessarily in precise axial alignment and the whisker ends of the leads are guided in a straight line into the jacket and against the crystal.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what we claim and desire to obtain by Letters Patent of the United States is:

1. A device for joining the end of one lead having a glass bead thereon to the end of another lead having a fusible glass socket, comprising a frame, an annular plunger mounted for reciprocation to said frame and having an axial passage adapted to receive said one lead and an enlarged recess adapted to receive said glass bead, a relatively massive annular nest of a material having a high co-efficient of heat conductivity mounted to said frame and having a passage coaxial with that of said plunger to receive said other lead, a relatively large clamp also of a material having a high co-efficient of heat conductivity pivotally mounted to said frame and adapted in one position to restrict the nest passage and engage one end of said socket to thereby limit the movement of said socket and in another position to open said nest passage and thereby permit said socket to pass through the nest passage, means to move said clamp to open position, said plunger being adapted to seat the beaded end of said one lead in said enlarged recess and to reciprocate to and away from said nest whereby said beaded end may be guided into said socket, friction means mounted to said frame in alignment with said passages for holding said one lead in position upon retraction of said plunger, a looped ribbon-form heating element positioned between said nest and said plunger for fusing said socket to said beaded end upon retraction of said plunger, a pair of spring-loaded pivoted jaws mounted adjacent said nest and adapted to engage said other lead when in a closed position, and a link connecting each jaw member on opposite sides of their respective pivot points whereby movement of one jaw member will produce a corresponding movement in the other jaw member so that the jaws will be opened and closed in unison.

References Cited

UNITED STATES PATENTS

| | | | |
|---|---|---|---|
| 2,693,555 | 11/1954 | North et al. | 65—59 X |
| 2,779,134 | 1/1957 | Gates | 65—155 |

FOREIGN PATENTS

| | | |
|---|---|---|
| 1,228,084 | 3/1960 | France. |

DONALL H. SYLVESTER, *Primary Examiner.*

S. LEON BASHORE, *Examiner.*

F. W. MIGA, *Assistant Examiner.*